United States Patent [19]

Coman

[11] Patent Number: 5,468,044
[45] Date of Patent: Nov. 21, 1995

[54] ENERGY ABSORBING CHILD SEAT

[75] Inventor: Sorin Coman, Madison Heights, Mich.

[73] Assignee: Hoover Universal, Inc., Plymouth, Mich.

[21] Appl. No.: 274,497

[22] Filed: Jul. 13, 1994

[51] Int. Cl.[6] .............................. B60N 2/42; B60R 21/00
[52] U.S. Cl. ............... 297/216.11; 297/238; 297/216.13; 297/472; 296/68.1
[58] Field of Search ............................. 297/238, 216.13, 297/216.14, 216.11, 472; 296/68.1; 280/805; 188/371.1

[56] References Cited

U.S. PATENT DOCUMENTS

| | | | |
|---|---|---|---|
| 3,198,288 | 8/1965 | Peesunka | 297/472 |
| 3,838,870 | 10/1974 | Hug | 280/805 X |
| 5,332,284 | 7/1994 | Elton et al. | 297/238 |

Primary Examiner—Kenneth J. Dorner
Assistant Examiner—Anthony Barfield
Attorney, Agent, or Firm—Harness, Dickey & Pierce

[57] ABSTRACT

An energy absorbing child seat in which a back support panel of the child seat is attached to a supporting structure or frame through energy absorbing brackets which plastically deform during a vehicle collision allowing a seat occupant to travel forward relative to the supporting structure and thus reduce the relative velocity and deceleration between the occupant's head and shoulders to reduce neck loads and neck injuries.

8 Claims, 3 Drawing Sheets

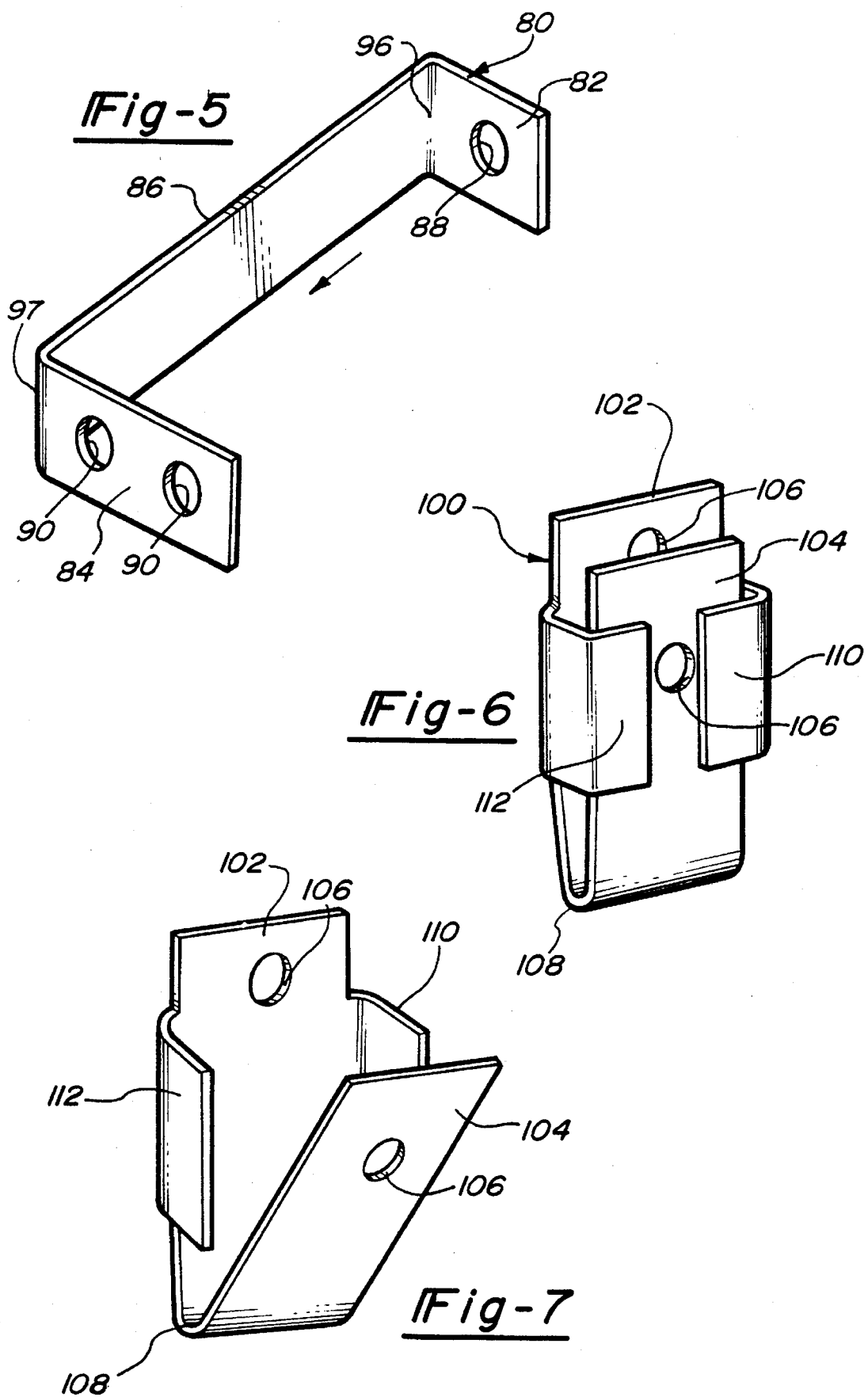

5,468,044

ENERGY ABSORBING CHILD SEAT

BACKGROUND AND SUMMARY OF THE INVENTION

The present invention relates generally to a motor vehicle child seat and in particular to an energy absorbing child seat:.

Special child seats that provide protection for small children in motor vehicles are well known. Two different types of child seats have been developed. One type is a separate seat which is placed upon a vehicle seat and attached thereto by the seat belt provided as part of the vehicle seat. A second type of child seat, commonly referred to as an "integral child seat," has the components of the child seat built into the vehicle seat. Integral child seats typically include one or more moveable components which, in one position, enable use of the vehicle seat by an adult, and in a second position enable use by a small child. Common elements of both types of child seats are a lower seat support, a back support panel and a restraint system for the seat occupant. The restraint system generally includes one or two shoulder belts which are operatively connected between the back support panel and the seat support to restrain a passenger positioned on the seat support and against the back panel.

Any vehicle passenger, a child or an adult, can sustain neck injuries when restrained in a seat by a shoulder belt. When the vehicle is involved in a front impact vehicle collision, the passenger's torso is restrained against the seat back by the shoulder belt while the passenger's head is free to move forward, bending the neck and possibly over extending the neck muscles. In small children, the ratio of the head mass to the body mass is higher than for an adult. As a result, children are somewhat more likely to receive neck injuries in a given vehicle collision. The present invention seeks to reduce neck injuries in children by providing energy absorbing mounting brackets to connect the back support panel of the child seat to the supporting seat structure or frame. The energy absorbing brackets allow the back support panel to move forward relative to the seat frame. For a child seat in the rear seat of a vehicle, ample space is available for the back support panel movement. The result is reduced relative velocity and deceleration between the child's head and shoulders, thereby reducing neck loads and injuries.

The present invention employs brackets which are plastically deformable under a predetermined load and are designed for specific load versus deflection characteristics which will provide the desired energy absorption. During normal seat loading in the absence of a vehicle collision, the seat brackets will hold the back support panel substantially rigidly to the seat structure. The energy absorbing brackets are designed to plastically deform only during the relatively high loading experienced in a vehicle collision.

Further objects, features and advantages of the invention will become apparent from a consideration of the following description and the appended claims when taken in connection with the accompanying drawings.

BRIEF DESCRIPTION OF THE DRAWINGS

FIG. 5 is a perspective view of the bracket shown in FIG. 4 plastically deformed following a vehicle collision; and FIGS. 6 and 7 are perspective views similar to FIGS. 4 and 5 showing an alternative embodiment of the energy absorbing mounting bracket of the present invention.

DETAILED DESCRIPTION OF THE PREFERRED EMBODIMENT

Figure 1:
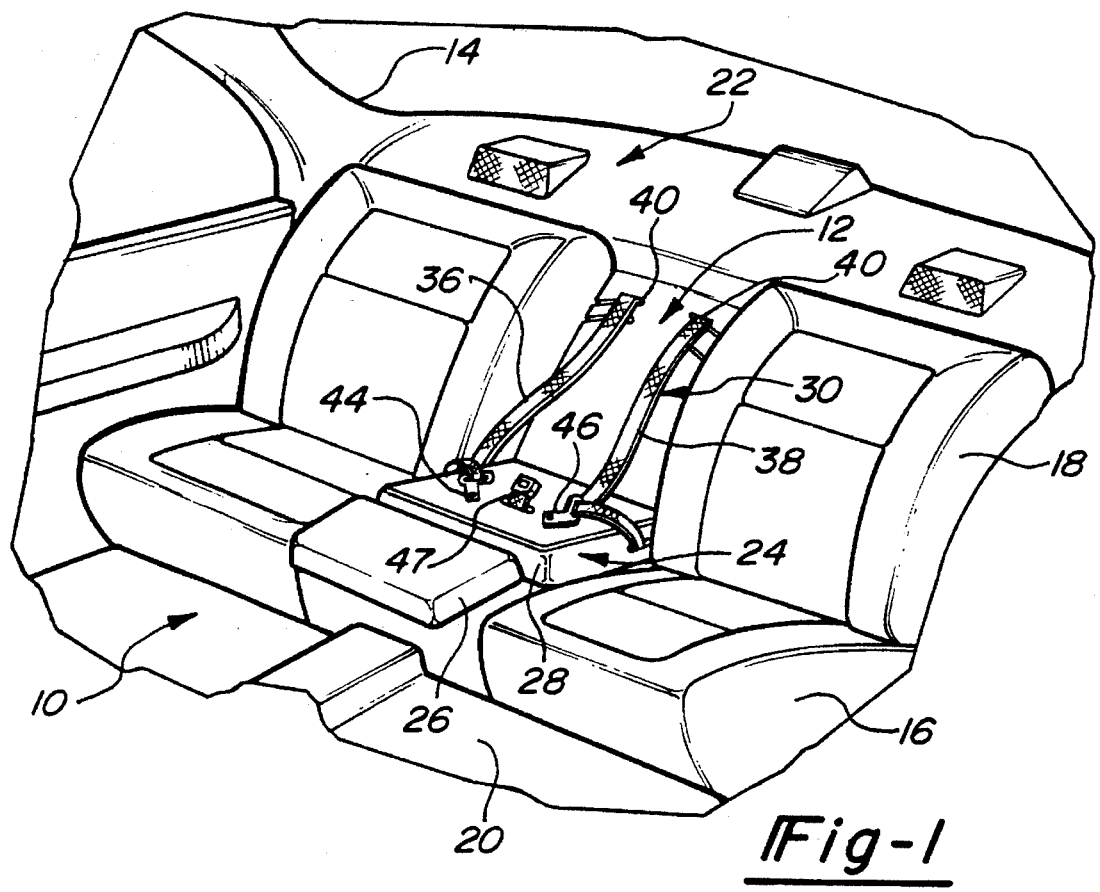
FIG. 1 is a perspective view of a vehicle seat assembly containing an energy absorbing integral child seat of the present invention.

A passenger car seat assembly 10 incorporating an energy absorbing integral child seat 12 of the present invention is shown in FIG. 1. Seat assembly 10 is of a conventional bench seat design used as a rear seat in a passenger car. Seat assembly 10 includes a lower seat cushion 16 and a seat back 18 extending upwardly at the rear of the lower seat cushion. The passenger car 14 in which the seat assembly is installed includes a vehicle body having a floor pan 20 and a rear shelf 22 extending rearwardly at the upper end of the seat back 18. The seat back 18 is constructed of a frame 19 (FIG. 2) carrying a foam pad or pads which are covered with an upholstery cover forming the exterior surface of the seat assembly.

Figure 2:
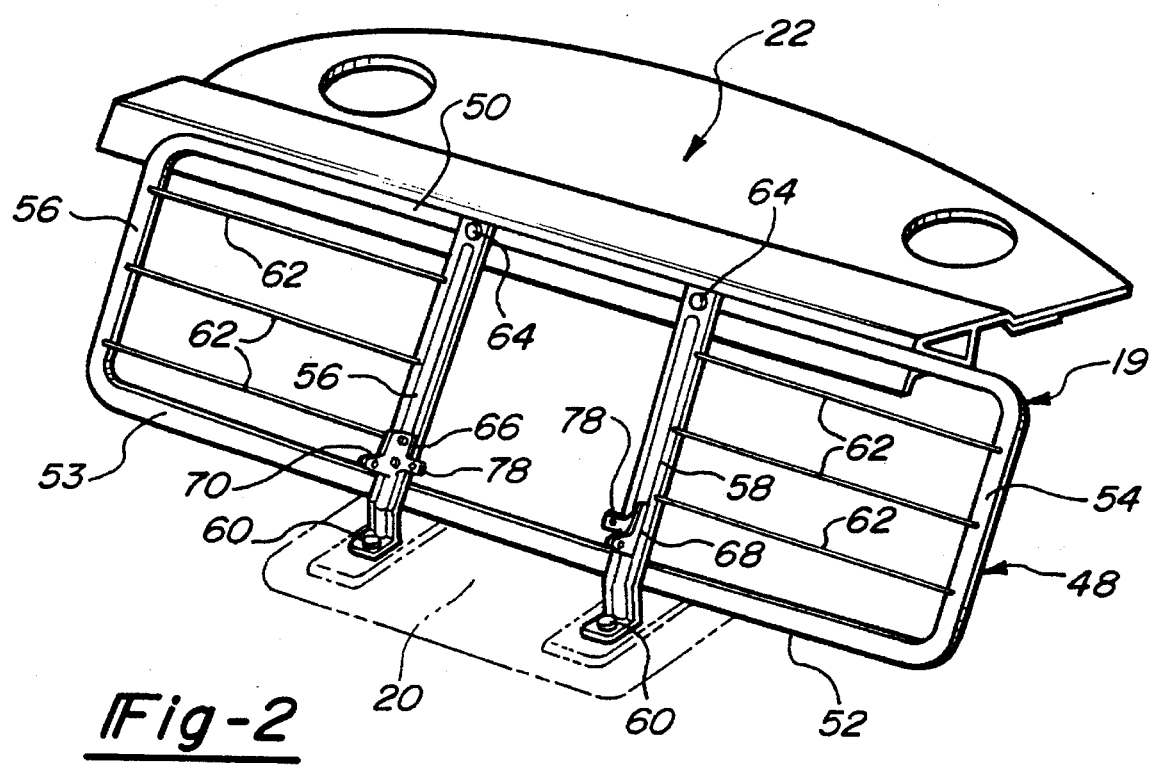
FIG. 2 is a perspective view of the seat back frame of the vehicle seat assembly attached to a motor vehicle body.

The child seat 12 is shown in FIG. 1 in a deployed use position. Child seat 12 includes a seat support 24 which is pivotally mounted to the frame 19 by a mounting brackets 66, 68 (FIG. 2). When the child seat is deployed, seat support 24 forms a child seat cushion extending forwardly from the seat back in a generally horizontal position. A footrest 26 is attached to the upper or forward end 28 of the seat support 24 by a flexible hinge not shown.

With reference to FIG. 2, the frame 19 is shown in greater detail. Frame 19 includes a generally rectangular peripheral frame member 48 comprising a top horizontal segment 50, bottom horizontal segments 52, 53 and upright posts 54, 55 at the laterally outer ends of the top and bottom segments. Two upright columns 56, 58 are each attached at their lower ends through nut and bolt assemblies 60 to the vehicle floor pan 20. At their upper ends, the upright columns are attached to the top segment 50 of the peripheral frame member and to the; vehicle rear shelf 22 by bolts 64. Spring wires 62 extend laterally across the seat back from the outer upright posts 54 to the upright columns 56, 58 to provide support and suspension for the seat back foam pads.

Figure 3:
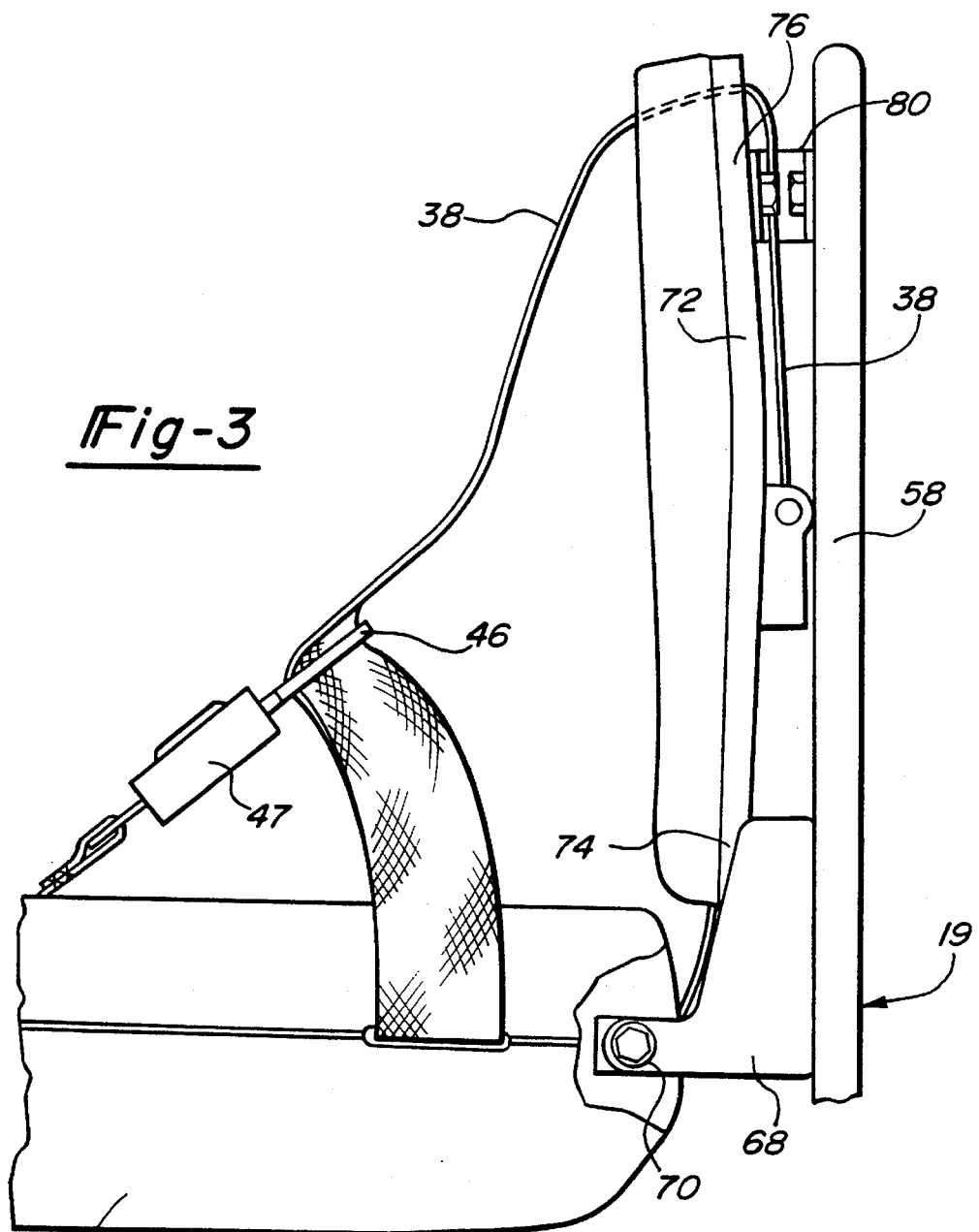
FIG. 3 is a side elevational view of an integral child seat structure having the energy absorbing mounting brackets of the present invention.

Seat back frame 19 includes a pair of lower mounting brackets 66, 68 attached to the upright columns 56, 58 adjacent to the lower ends thereof. The lower mounting brackets each include a boss 70 for rotatably mounting the seat support 24 to the frame 19. The child seat includes a back support panel 72 having a lower end 74 and an upper end 76. The lower mounting brackets 66, 68 include a second boss 78 for attachment of the back support panel to the frame 19 adjacent the lower end 74 of the support panel 72. A pair of upper energy absorbing mounting brackets 80, only one of which is shown in FIG. 3, are used to attach the back support panel 72 to the upright columns 56, 58 of the back frame 19, adjacent the upper end of the back support panel. The upper mounting brackets 80 are described in greater detail below.

With reference again to FIG. 1, the child seat 12 also includes a restraint system 30 to restrain a passenger positioned on the seat support 24 and against the back support panel 72. The restraint system 30 includes right and left belts 36, 38. The belts 36, 38 are connected at their lower ends to the seat support 24 at the right and left sides, respectively. From there, the belts extend upwardly, overlying the back support panel 72 and passing through slots 40 in the back support panel adjacent the upper end thereof. The belts continue downward behind the back support panel and are connected to a single adjustment strap 42. The adjustment strap is, in turn, connected to a conventional seat belt retractor 43 or other mechanism for adjusting the lengths of the belts 36, 38 the belts 36, 38 each carry one of the slidable clasps 44, 46, respectively, which are insertable into a buckle 47 attached to the seat support 24 in a location between the legs of a seat occupant. When the seat belt clasps are inserted into the buckle, the belts combine to form lap belts extending from each side of the seat support 24 to the buckle 47. From the buckle 47, the belts extend upwardly over each shoulder of a child seat occupant and then extend through the back support panel 72 forming shoulder belts for holding a seat occupant against the back support panel.

During a frontal vehicle collision, the, child seat occupant will be thrust forward from the back support panel and will apply a significant load to the belts 36, 38 extending over the occupant's shoulders. This load is transferred from the belts to the back support panel 72 and from the back support panel to the seat back frame 19 through the lower mounting brackets 66, 68 and upper mounting brackets 80.

Figure 4:
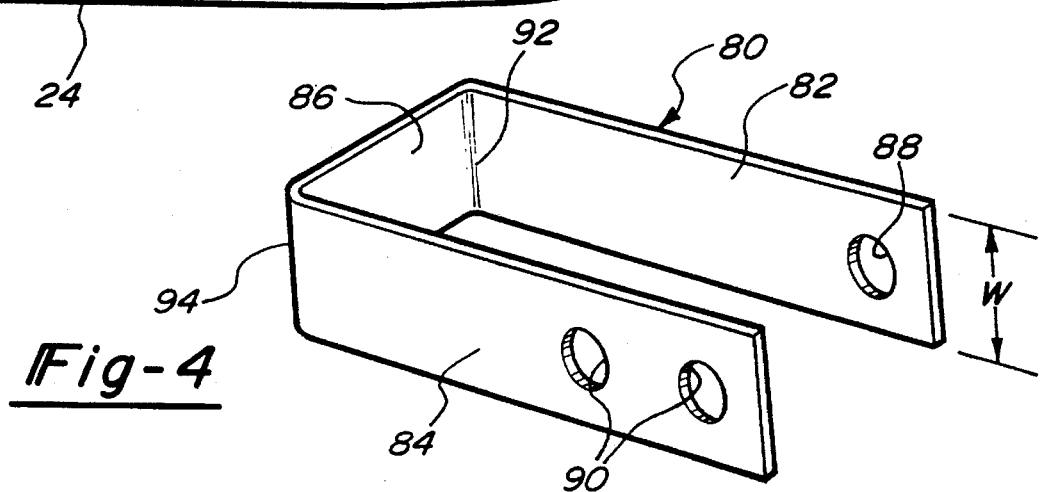
FIG. 4 is a perspective view of an energy absorbing bracket shown before a vehicle collision.

One of the upper mounting brackets 80 is shown in FIG. 4. Bracket 80 is made of sheet stock that is beat into a generally U-shape or J-shape. The bracket has a rear end portion 82 and a front end portion 84 joined together by a connection or bottom portion 86. One or more bends are formed in the bracket between the front and rear end portions 84, 82. The rear end portion includes a mounting aperture 88 through which the bracket 80 is attached to one of the upright columns 56, 58 of the seat frame. The front end portion includes a pair of apertures 90 for use in attaching the back support panel 72 to the bracket 80. The bracket is shown with a generally right angle bend 92 between the rear end portion 82 and the connecting portion 86, and a generally right angle bend 94 between the front end portion 84 and the connecting portion 86. The rear and front end portions 82, 84 are spaced from one another to provide a clearance for one of the belts 36, 38 to pass between as the belts extend downwardly behind the back support panel.

During a frontal vehicle collision, a forwardly directed force will be applied to the back support panel by the belts 36, 38. This force is transferred through the brackets 80 to the seat back frame 19. The brackets 80 are designed to plastically deform under the load applied by a child seat occupant. The deformation of the bracket 80 allows the upper end of the back support panel 72 to move forward relative to the seat back frame 19. This occurs as the bracket straightens at the original bends 92, 94 and new bends 96, 97 are formed. With the above described deformation, the length of end portions 82 are shortened and the length of the connecting portion 86 is increased. The material thickness of the bracket 80, the material width shown as the dimension W in FIG. 5, as well the material itself, are all selected to provide specific load versus deflection characteristics for the brackets based on the anticipated size of the child occupant.

An alternative energy absorbing bracket is shown in FIG. 6 and designated generally as 100. The bracket 100 is generally V-shaped having a rear portion 102 and a front portion 104, each having apertures 106 for attachment of the bracket to the frame 19 and back support panel 72. The front and rear plates are joined together at a single bend 108. The rear portion 102 is formed with a pair of tabs 110, 112 which extend forward and around the front portion 104. During a frontal vehicle collision, the bracket is deformed by opening the bend 108 which causes the two tabs 110, 112 to open as well, allowing the front portion 104 to move forward from the rear portion 102. Again, the plastic deformation in the bracket 100 absorbs energy and reduces the relative velocity between the seat occupant's head and shoulders, thereby reducing neck injuries. The bracket 100 is configured to be used in a location where the belts 36, 38 do not pass through the bracket as in the case of the bracket 80 shown in FIGS. 4 and 5.

While the energy absorbing child seat has been shown with a particular restraint system 30, it will be appreciated that the energy absorbing child seat can be used with other restraint systems in which the restraint loads are applied to the back support panel. Likewise, the specific structure of the seat back frame 19 is not to be viewed as limiting the scope of the present invention. Energy absorbing brackets can be used to move the back support panel at the top, bottom or both ends of the panel. Furthermore, the brackets can be welded, bolted, riveted, etc. to the back support panel and seat frame. Bolts are preferred because they enable easy replacement of the brackets after they have been deformed in a vehicle collision.

The present invention utilizes deformable energy absorbing brackets in the child seat restraint system load path to allow limited forward displacement of a seat occupant. This limited displacement reduces the relative deceleration of the occupant's head to shoulders, reducing neck forces. In the preferred embodiment, this is accomplished by mounting the child seat back support panel to the set frame with deformable brackets. By allowing the back support panel to move forward with the seat occupant, rebound injuries are also reduced. However, the back support panel could be stationary on the seat frame and the deformable brackets placed elsewhere in the restraint system load path.

While the invention has been disclosed and described in the context of a vehicle bench seat having an integral child seat, the invention is not limited to a bench seat structure, but may be used in child seats integrated in other types of vehicle seats. Furthermore, the invention may also be applicable to add-on child seats.

It is to be understood that the invention is not limited to the exact construction illustrated and described above, but that various changes and modifications may be made without departing from the spirit and scope of the invention as defined in the following claims.

I claim:

1. A seat assembly for a vehicle having a body structure, said seat assembly comprising:

a child seat subassembly including a generally upright back support panel, a seat cushion, and a restraint system for restraining a passenger positioned on the seat cushion and said back support panel; and mounting means for operatively coupling said restraint system to said body structure forming a load path for transferring restraint loads from said restraint system to said body structure, said mounting means including at least one plastically deformable member in said load path configured to absorb energy by limited plastic deformation in bending during a vehicle collision at a load less than a failure load of said plastically deformable member, said plastically deformable member being a plate bent into a generally U-shape configuration having spaced opposite sides each having an initial length and a bottom portion having an initial length connected to said sides at bends in said plate, said sides being spaced apart by said length of said bottom portion, said deformable member being located in said load path so that a vehicle frontal collision applies a load on said deformable member to pull said sides further apart, said member deforming during a vehicle collision by bending to increase the length of said bottom portion and decrease the length of at least one of said sides whereby said sides are spaced further apart following the collision.

2. The seat assembly of claim 1 wherein said mounting means includes two of said plastically deformable members for coupling said restraint system to said body structure.

3. A seat assembly for a vehicle having a body, said seat assembly comprising:

a seat frame adapted to be attached to the vehicle body;

a child seat subassembly including a generally upright back support panel having upper and lower ends disposed forward of said frame, a seat cushion panel extending forward from said back support panel adjacent the lower end of said back support panel and a restraint system operatively connected to said back support panel and said seat cushion to restrain a passenger seated on said child seat subassembly, said restraint system including a pair of shoulder belts for passing over the shoulders of an occupant of said child seat subassembly and extending rearward through said back support panel;

lower attaching means for attaching said back support panel to said frame at said lower end thereof;

at least one upper bracket for attaching said back support panel to said frame adjacent said upper end, said upper bracket having a frame attaching portion attached to said frame and a panel attaching portion attached to said back support panel; and said shoulder belts, after passing through said back support panel being operatively coupled to said at least one upper bracket to apply restraint loads to said at least one upper bracket to deform said at least one upper bracket during a vehicle collision to allow the upper end of said back support panel to move forward, bending said back support panel between said upper and lower ends as said lower end is held substantially stationary to said frame by said lower attaching means.

4. The seat assembly of claim 3 wherein said at least one upper bracket includes a pair of said plastically deformable brackets for mounting said back support panel to said frame at said upper end of said back support panel.

5. The seat assembly of claim 4 wherein said frame attaching portion is spaced rearward of said panel attaching portion and said shoulder belts extend downward between said spaced frame and panel attaching portions whereby during a front vehicle collision, said shoulder belts apply a forward load on said panel attaching portion causing said at least one bracket to deform.

6. The seat assembly of claim 3 wherein said at least one upper bracket is a plate bent to form said frame and panel attaching portions spaced from one another and to have at least one bend therebetween, said plate deforming during a vehicle collision by further bending between said frame and panel attaching portions to increase the space between said frame and panel attaching portions whereby said back support panel is moved from said frame at said upper end.

7. The seat assembly of claim 3 wherein said plate is bent into a generally U-shape configuration having spaced opposite sides forming said frame and panel attaching portions each having an initial length and a bottom portion having an initial length connected to said frame and panel attaching portions at bends in said plate, said sides being spaced apart by said length of said bottom portion, said bracket deforming during a vehicle collision by increasing the length of said bottom portion and decreasing the length of at least one of said sides whereby said sides are spaced further apart after a collision than before.

8. The seat assembly of claim 3 wherein said frame attaching portion is spaced forward of said panel attaching portion and said shoulder belts extend downward between said spaced frame and panel attaching portions whereby during a front vehicle collision, said shoulder belts apply a forward load on said panel attaching portion causing said at least one bracket to deform.

* * * * *